F. F. CAMERON.
WASHER.
APPLICATION FILED JULY 14, 1916.

1,221,023.

Patented Apr. 3, 1917.

Inventor.
F. F. Cameron
by Egerton R. Case
Atty.

UNITED STATES PATENT OFFICE.

FREDERICK FRAZER CAMERON, OF RIDGECLOUGH, ALBERTA, CANADA.

WASHER.

1,221,023.   Specification of Letters Patent.   Patented Apr. 3, 1917.

Application filed July 14, 1916. Serial No. 109,303.

*To all whom it may concern:*

Be it known that I, FREDERICK FRAZER CAMERON, residing in the village of Ridgeclough, Province of Alberta, Canada, a subject of the King of Great Britain, have invented certain new and useful Improvements in Washers, of which the following is a specification.

My invention relates to improvements in washers and the principal object of my invention is to provide washers which can be easily applied to a shaft or other support without the necessity of having to remove any parts carried by said shaft or other support, and thus greatly reduce labor in placing or replacing washers, and another object of my invention is to provide a particular form of lock for my washer, and the construction of my invention will be hereinafter particularly set forth and what I claim as new will be pointed out in the claims forming part of this specification.

Figure 1:
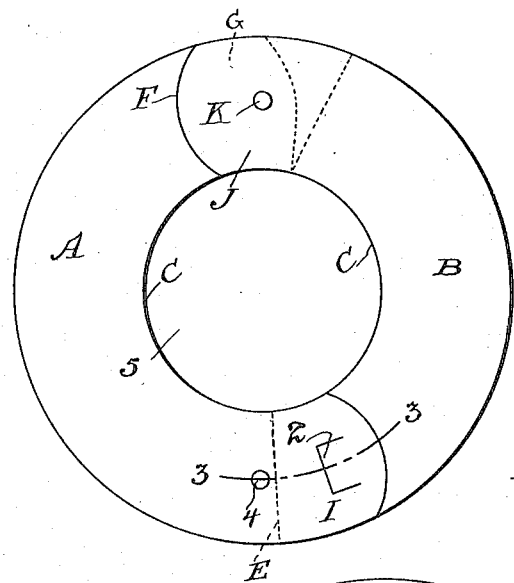
Figure 2:
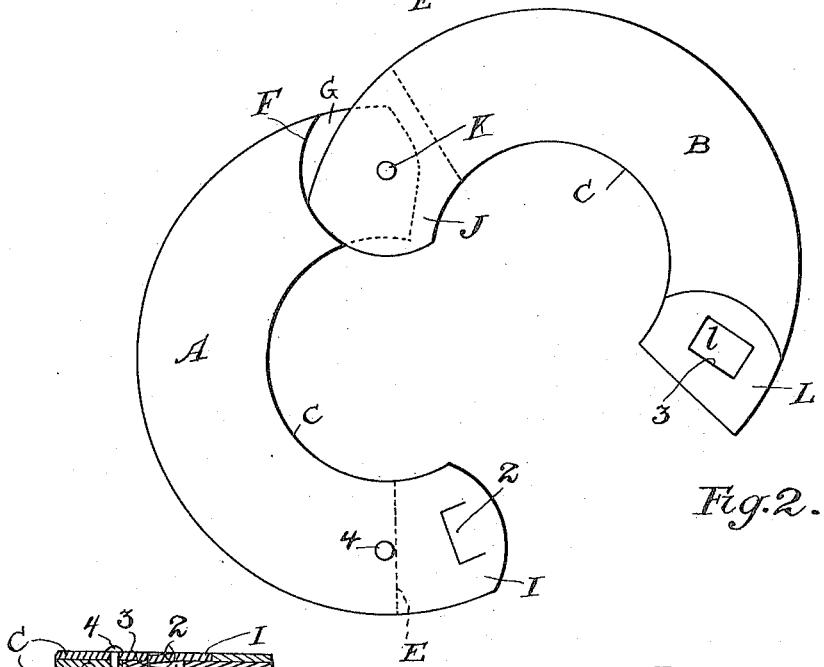
Figure 3:
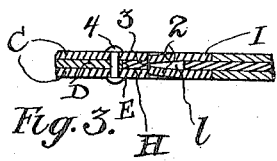

Figure 1 is a view of my washer with the parts closed, and Fig. 2 is a view, similar to Fig. 1, except that the parts are opened, ready to be placed around a shaft or other support, and Fig. 3 is a longitudinal section on the line 3—3, Fig. 1.

In the drawings like characters of reference indicate corresponding parts in each figure.

According to my preferred form of construction, my washer comprises two segmental ring sections, A and B. These segmental sections are each preferably composed of outer segmental members C and middle segmental members D. These various members may be suitably brazed together as will be understood. In the section A the outer segmental members C project at one end beyond the end E of the middle member D, and one end of the said middle member projects beyond the ends F of the members C, thus forming a tongue G.

The construction just described provides a slot H between the ends I of the members C. The segmental member B is substantially constructed as described in respect of the member A, and when these members are assembled, the slot (not shown) between the ends J of the members C of the section B receives the tongue G, and these parts are held in relationship by a pivot K. The size of the slot between the ends J is of course large enough to permit of the freedom of movement of these parts and the ends F are concave and the extremities of the ends J are convex, thus allowing for the movement and snugness of fit. The middle member D of the section B is provided with a tongue L which is designed to be received by the slot H, and this tongue is provided with a slot 1, which is designed to be positioned in alinement with the lugs 2, stamped from the ends I of the outer members C of the section A. When the parts are in the position illustrated in Fig. 1, the free ends of the lug 2 are bent to extend into the slot 1 so as to be in contact with the side 3 of said slot, thus forming a lock. 4 is a rivet mounted in the section A and extending through the members thereof, showing that I may rivet the various parts of my washer together in place of brazing them.

Of course this washer is provided with the usual central opening 5 and this opening is formed by the members A and B when placed together.

The position of the parts illustrated in Fig. 2 will show clearly just how this washer is placed over the shaft or other support without the necessity of having to remove from said support any parts carried thereby.

What I claim as my invention is:

1. As a new article of manufacture, a washer comprising two segmental ring sections pivoted together at opposing ends, the free end of one section being provided with a slot and the free end of the other section being provided with a lug, stamped therefrom, said lug designed to be bent to extend into said slot when the said sections are closed together to form a lock.

2. As a new article of manufacture, a washer comprising two segmental ring sections each composed of two outer segmental ring members and a middle segmental ring member, the outer members of each section designed to extend beyond one end of each of the said middle members so as to form a slot at one end of each of the said segmental ring sections, and one end of each of the said middle members designed to project beyond the ends of said outer members, thus forming tongues, the tongue of one of said segmental ring sections positioned in the slot at one end of the other of the said segmental ring sections; a pivot passing through said last-mentioned tongue, and its associated parts to pivot said segmental ring sections together, and a pair of lugs stamped from the free end of one of the said segmental ring sections and designed to be bent into a slot formed in the tongue at the free end of the said other segmental ring section to provide a lock.

In testimony whereof I affix my signature in presence of two witnesses.

FREDERICK FRAZER CAMERON.

Witnesses:
R. A. CAMERON,
W. MACKENZIE.

Copies of this patent may be obtained for five cents each, by addressing the "Commissioner of Patents, Washington, D. C."